Patented May 24, 1938

2,118,521

UNITED STATES PATENT OFFICE 2,118,521

POLISHING COMPOSITION

John D. Pickens, Flint, Mich., assignor to E. I. du Pont de Nemours & Company, Wilmington, Del., a corporation of Delaware No Drawing. Application February 27, 1936, Serial No. 66,062

4 Claims. (Cl. 134—24)

This invention relates to wax polishing compositions and more particularly to wax polishing compositions having improved luster when applied to painted, lacquered, enameled and the like surfaces.

Wax polishing compositions are usually prepared from natural or synthetic waxes or mixtures thereof such as carnauba, ceresin, candelilla, paraffin and dispersed or dissolved in suitable dispersing media or solvents and are of such consistency as to be readily spread, so as to form a uniformly thin film on the surface to which they are applied. Most of the wax polishing compositions as now prepared possess certain defects with regard to the initial luster imparted to the surface to which they are applied and also with regard to the retention of the luster. An improvement in the initial luster as well as the retention of luster of wax polishing compositions is therefore highly desirable.

This invention presents as a principal object the provision of a wax polishing composition which produces a finish possessing improved luster when applied to the surface to be polished.

Another object is the provision of a wax polishing composition which produces a finish having improved initial luster and improved retention of luster in service.

These objects are accomplished according to the present invention by preparing a wax polishing composition comprising usually a mixture of waxes of mineral or vegetable origin dispersed in a suitable dispersing medium and containing a proportion of an acid phthalate ester of an aliphatic alcohol of four or more carbon atoms.

The invention is best described by illustrations of preferred compositions of the improved wax polishing composition. It is understood, however, that these compositions are given by way of illustration and not by way of limitation except as defined in the appended claims.

*Example 1*

| | Parts by weight |
|---|---|
| Carnauba wax | 16 |
| Paraffin wax | 11 |
| Mineral spirits | 71 |
| Lauryl acid phthalate | 2 |
| | 100 |

The polishing compositions are best prepared by melting the waxes and adding the solvent with thorough stirring. The material is then poured in suitable containers and allowed to cool. For optimum results, adherence to certain specified temperatures in the preparation of the polishing compositions is desirable. The waxes should be melted by heating and the solvent should also be heated to such a temperature so that the admixture of the wax and the solvent will have a temperature of approximately 60 deg. C. at which temperature it is poured into containers. The procedure disclosed and claimed in co-pending application S. N. 748,666 filed October 17, 1934 in the name of Pickens and Thompson has been found to yield satisfactory results.

*Example 2*

| | Parts by weight |
|---|---|
| Carnauba wax | 16 |
| Ceresin wax | 11 |
| Mineral spirits | 71 |
| Lauryl acid phthalate | 2 |
| | 100 |

*Example 3*

| | Parts by weight |
|---|---|
| Carnauba wax | 16 |
| Paraffin wax | 5 |
| Beeswax | 6 |
| Mineral spirits | 71 |
| Lauryl acid phthalate | 2 |
| | 100 |

*Example 4*

| | Parts by weight |
|---|---|
| Candelilla wax | 16 |
| Paraffin wax | 11 |
| Mineral spirits | 71 |
| Lauryl acid phthalate | 2 |
| | 100 |

*Example 5*

| | Parts by weight |
|---|---|
| Carnauba wax | 15 |
| Paraffin wax | 15 |
| Mineral spirits | 68 |
| Lauryl acid phthalate | 2 |
| | 100 |

*Example 6*

| | Parts by weight |
|---|---|
| Carnauba wax | 16 |
| Paraffin wax | 11 |
| Citronellol | 2 |
| Mineral spirits | 69 |
| Lauryl acid phthalate | 2 |
| | 100 |

In this example it is preferred to melt the waxes and bring the temperature to 160 deg. C. and the solvent to 20 deg. C. before mixing the two. The resulting mixture should have a temperature of approximately 60 deg. C. before being placed in suitable containers and allowed to cool.

The examples given represent preferred combinations of waxes but it is to be understood that other combinations and proportions may be used without departing from the spirit of the invention. Such other combinations and proportions will be readily apparent to those skilled in the art of preparing wax polishing compositions.

In the examples the use of lauryl acid phthalate is noted as the acid phthalate ester constituent of the compositions. Other acid phthalate esters such as butyl acid phthalate, n-decyl acid phthalate, oleyl acid phthalate, stearyl acid phthalate may be used in place thereof with satisfactory results. While the amount of the acid phthalate ester in the examples is noted as 2% it has been found that this percentage is not particularly critical and amounts from 1 to 6% may be used with satisfactory results. The use of less than 1% of the acid phthalate ester does not give the desired improvement, and amounts greater than 6% are unnecessary.

In general it has been found that the acid phthalate esters of alcohols having more than 4 carbon atoms are the only ones which produce an improvement in the luster imparted by the waxes in which they are incorporated. The neutral esters are not effective nor are the alcohols themselves. The acid esters of alcohols having less than 4 carbon atoms are not sufficiently soluble in the solvents or dispersing media ordinarily employed in preparing the polishing wax compositions to be effective.

While I do not wish to be bound by any explanation of the theory of my invention, it appears likely that the acid phthalate ester homogenizes the wax mixtures, that is, the various constituents of the individual waxes, thus making the various ingredients more soluble in each other and in the other waxes which are used to make up the final composition. It is also likely that better adhesion of the wax composition to the surface to which it is applied is obtained due to the presence of the acid phthalate ester probably through a "wetting" of the painted, lacquered or enameled surface to which the wax composition is applied.

Compositions of the present invention are particularly adapted for application to painted, lacquered or enameled surfaces to produce a polish possessing a higher luster. The luster produced is an improvement over present types of polishes both as to initial luster and retention of luster in service. Wax polishing compositions may be also applied to wood finishes and other types of finishes as well as to the painted, lacquered and enameled surfaces noted above.

The principal advantage of the composition of the invention is the provision of wax polishing compositions having improved initial luster when applied to painted, lacquered, enameled and the like surfaces or to wood and similar surfaces.

A further advantage is the provision of wax polishing compositions which when applied to suitable surfaces impart a more durable polish than is practical with present types of similar compositions.

A still further advantage is the provision of wax polishing compositions which when applied to suitable surfaces impart a high initial luster which is retained to a much greater degree than present types of wax polishing compositions.

It is apparent that many widely different embodiments of this invention may be made without departing from the spirit and scope thereof; and, therefore, it is not intended to be limited except as indicated in the appended claims.

I claim:

1. A liquid wax polishing composition consisting of a wax, a readily volatile solvent therefor and 1 to 6% of an acid phthalate alkyl ester, the alkyl group having more than 4 carbon atoms.

2. The composition of claim 1 in which the wax is a mixture of mineral and vegetable waxes.

3. The composition of claim 1 in which the acid phthalate ester is selected from the group consisting of butyl acid phthalate, n-decyl acid phthalate, oleyl acid phthalate, lauryl acid phthalate, and stearyl acid phthalate.

4. A polishing composition having approximately the following composition:

| | Parts by weight |
|---|---|
| Carnauba wax | 16 |
| Paraffin wax | 11 |
| Mineral spirits | 71 |
| Lauryl acid phthalate | 2 |
| | 100 |

JOHN D. PICKENS.